(12) United States Patent
Fischer et al.

(10) Patent No.: US 7,779,239 B2
(45) Date of Patent: Aug. 17, 2010

(54) USER OPT-IN PROCESSOR FEATURE CONTROL CAPABILITY

(75) Inventors: Stephen A. Fischer, Gold River, CA (US); Dion Rodgers, Hillsboro, OR (US); James A. Sutton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1140 days.

(21) Appl. No.: 10/900,875

(22) Filed: Jul. 28, 2004

(65) Prior Publication Data

US 2006/0026525 A1 Feb. 2, 2006

(51) Int. Cl.
G06F 7/38 (2006.01)
G06F 9/00 (2006.01)
G06F 9/44 (2006.01)
G06F 15/00 (2006.01)
(52) U.S. Cl. .................................................. 712/229
(58) Field of Classification Search .................. 712/229
See application file for complete search history.

(56) References Cited

U.S. PATENT DOCUMENTS 6,065,081 A * 5/2000 Stancil et al. ............... 710/104
6,081,901 A * 6/2000 Dewa et al. ................. 713/300
6,289,459 B1 9/2001 Fischer et al. .............. 713/200
6,427,202 B1 * 7/2002 Richardson et al. ........... 712/32
6,516,395 B1 * 2/2003 Christie ...................... 711/163

FOREIGN PATENT DOCUMENTS

DE 43 21 765 A1 6/1993

OTHER PUBLICATIONS

Official Action dated May 14, 2008 from the German Patent Office, pp. 1-4 (along with English language translation).

* cited by examiner

*Primary Examiner*—Eddie P Chan
*Assistant Examiner*—Corey Faherty
(74) *Attorney, Agent, or Firm*—Trop, Pruner & Hu, P.C.

(57) ABSTRACT

A processor includes a feature control unit to enable or disable one or more processor features individually in response to a user selectable setting. The feature control unit is adapted to disable the processor feature(s) if the user setting has not been updated in accordance with an input regardless of the value of the user setting prior to the update and to enable or disable the processor feature(s) in accordance with the updated user setting after it has been updated. The feature control unit may also include a lock unit to prevent changes to the updated user setting and a software feature selection unit to enable or disable processor features in response to a software feature selection setting and, optionally, only enable or disable processor features whose corresponding updated user setting is user enabled. The feature control unit may also include mechanisms to detect illegal feature selection conditions.

19 Claims, 5 Drawing Sheets ered to as the processor feature.

USER OPT-IN PROCESSOR FEATURE CONTROL CAPABILITY

BACKGROUND

The present invention relates generally to integrated circuit processors, and more specifically to mechanisms to control access to certain processor features.

It can be desirable to provide a capability to disable or otherwise prevent access to a processor feature. One method for allowing a user to disable a processor feature permits a user to set a preference whether the processor feature should be available or whether it should not be available or "visible". In one implementation, the processor feature defaults to being available or "visible". The processor feature is only disabled if the user preference setting is later changed to "not visible". In this case, the processor thereafter behaves as if the processor feature does not exist.

Some otherwise useful processor features can be misused in ways that create potential concerns for users. These concerns may not be adequately addressed by merely providing users the optional ability to disable such processor features which are enabled by default. Thus a need exists for a user opt-in processor feature control capability.

BRIEF DESCRIPTION OF THE DRAWINGS

The present invention is illustrated by way of example and not limitation in the figures of the accompanying drawings, in which like references indicate similar elements.

DETAILED DESCRIPTION

Figure 1:
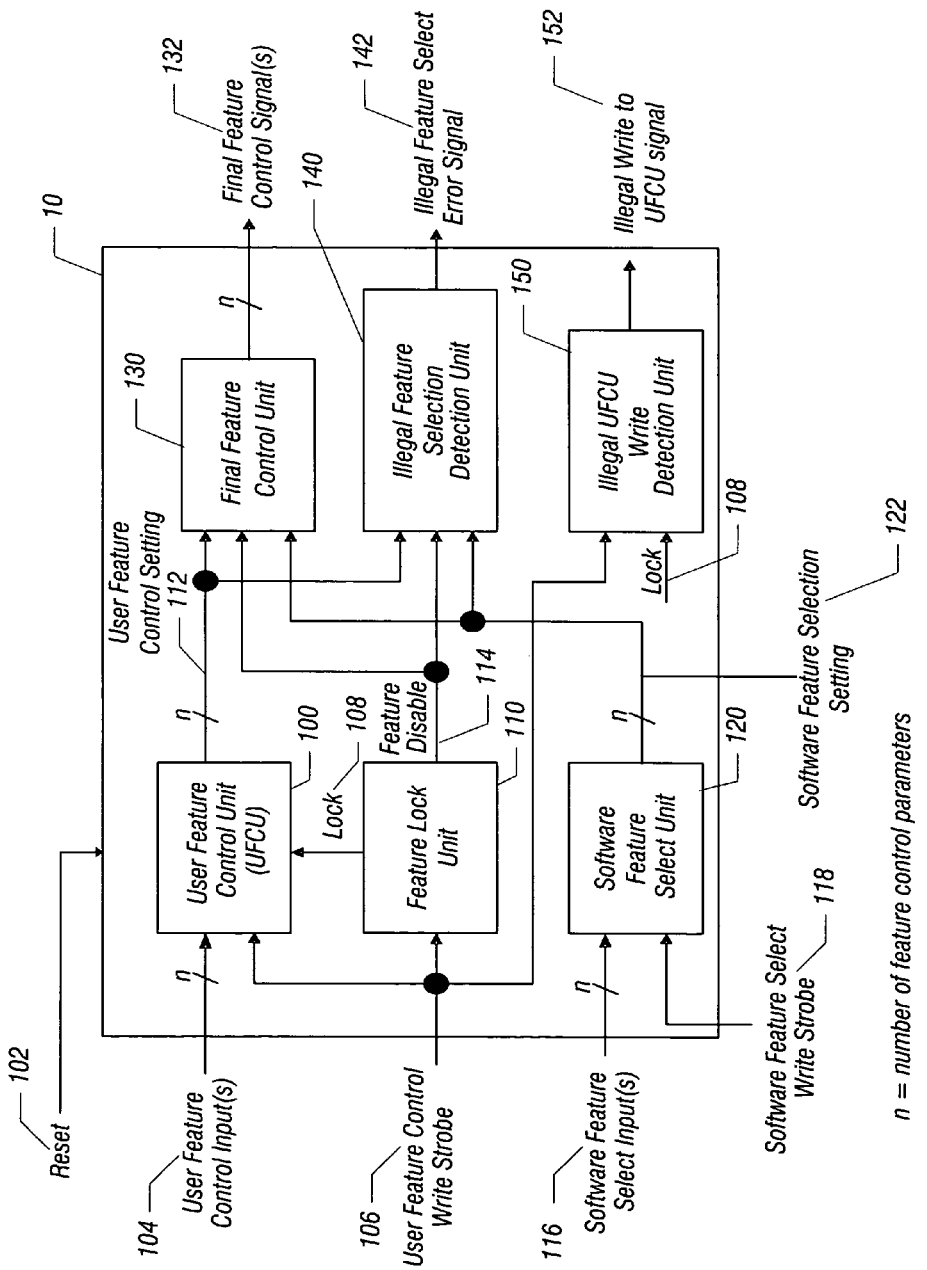
FIG. 1 is a block diagram of a processor feature control apparatus according to an embodiment of the present invention.

A method, apparatus, and system for a user opt-in processor feature control capability are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Processors such as those used as the "brains" of computers, cell phones and other electronic devices provide many capabilities or features. The instruction sets of such processors typically include hundreds of different instructions for manipulating data in a variety of ways. For example, computer microprocessors typically include Boolean logic instructions, fixed and floating point arithmetic instructions, single instruction multiple data (SIMD) instructions, move instructions to move data between various locations, and store instructions to store data in various locations. Processors may also include a variety of other features or instructions to, for example, control power usage, provide other information about the processor, and provide additional hardware security capabilities.

The level of concern held by users of computers or other electronic devices regarding the availability of specific processor features may vary from "no concern" to "critical concern". For example, a computer processor's ADD instructions are probably of no concern to computer users while the potential misuse of a processor security feature might create significant user concerns. In addition, some users may have high concerns regarding the accessibility of a particular processor feature while other users may have no concerns regarding the same feature. To address such user concerns, processors may provide a capability for users to control the availability of certain processor features by allowing users to enable and disable the features, or otherwise control the availability or visibility of specific processor features or instructions.

For a processor feature or instruction that potentially creates critical user concerns, it is important to provide users a secure capability to control the availability of that feature. According to one embodiment of the present invention, this may be done by implementing a user feature control selection that is effectuated by the processor before the feature can be enabled or otherwise made available. In one embodiment, after the user feature selection (to either make the feature available or not) is effectuated, that selection may be locked to prevent any change to it. In one embodiment, the ability to control multiple processor features individually through user selectable settings, software selectable settings, or a combination of these settings may be provided.

FIG. 1 is a block diagram of a processor feature control apparatus according to an embodiment of the present invention. A Processor Feature Control Unit 10 may include a User Feature Control Unit 100 that provides a User Feature Control Setting 112. The User Feature Control Setting 112 may be initialized to a default value in response to a Reset 102 condition. Thereafter, unless a Lock 108 signal is asserted, the User Feature Control Setting 112 of User Feature Control Unit 100 may be updated in response to assertion of a User Feature Control Write Strobe 106 according to user feature control values provided on User Feature Control Input(s) 104. In one embodiment, when the Lock 108 signal is asserted, no updates or changes to the User Feature Control Setting 112 can be made. In one embodiment, the User Feature Control Setting 112 may be updated during boot up of a computer by the BIOS (Basic Input Output System) according to user feature control selections. In one embodiment, the Reset 102 may occur only during system power-up to avoid changes to the User Feature Control Setting 112 after it has been updated.

Still referring to FIG. 1, a Feature Lock Unit 110 may provide the Lock 108 signal. In one embodiment, in response to assertion of a Reset 102 signal, the Lock 108 signal may be initialized to a de-asserted or inactive state. When de-asserted the Lock 108 signal may allow the User Feature Control Setting 112 of the User Feature Control Unit 100 to be updated in response to assertion of the User Feature Control Write Strobe 106. When the User Feature Control Write Strobe 106 is asserted, the Feature Lock Unit 110 may allow the Lock 108 signal to be written or set to is asserted or active state or otherwise change the state of the Lock 108 signal to its asserted or active state and lock it into that state to prevent any subsequent change to the User Feature Control Setting 112 or the Lock 108 signal. In this manner, only one update to the User Feature Control Setting 112 may be allowed before subsequent changes are locked out by the assertion of the Lock 108 signal.

As further show in FIG. 1, the Feature Lock Unit 110 may also provide a Feature Disable 114 signal which when asserted may cause a Final Feature Control Unit 130 to disable or make otherwise not accessible or "not visible" all processor features controlled by the Processor Feature Control Unit 10. In response to assertion of the Reset 102 signal, the Feature Disable 114 signal may be initialized to its asserted or active state to disable processor features as just described. Subsequently, when the User Feature Control Setting 112 is updated in response to the User Feature Control Input(s) 104 and the User Feature Control Write Strobe 106, the Feature Disable 114 signal may be changed to its de-asserted or inactive state. When the Feature Disable 114 signal is de-asserted, the User Feature Control Setting 112 may be allowed to affect which processor features are enabled or disabled by the Final Feature Control Unit 130. In one embodiment, when the Feature Disable 114 signal is de-asserted the Final Feature Control Unit 130 may enable or disable processor features solely in accordance with the User Feature Control Setting 112. In one embodiment, when the Feature Disable 114 signal is de-asserted the Final Feature Control Unit 130 may enable or disable processor features based on the corresponding User Feature Control Setting 112 and a corresponding Software Feature Selection Setting 122, as will now be discussed in more detail.

In addition to the user feature controls, it may be advantageous to provide a capability for software (such as operating system software or application software) to make processor feature selections. For example, computer operating system software may decide to save power by requesting that a processor turn off its floating point unit because no software currently running on the computer system is making use of the processor's floating point instructions. Thus, in certain embodiments the Processor Feature Control Unit 10 of FIG. 1 may also include a Software Feature Selection Unit 120 to provide a capability for software to affect the final processor feature controls. Feature selections by software (e.g., operating system and application software) may be provided to the Software Feature Select Unit 120 on Software Feature Select Input(s) 116. The Software Feature Selection Setting 122 of the Software Feature Selection Unit 120 may be updated according to the Software Feature Select Input(s) 116 in response to assertion of a Software Feature Selection Write Strobe 118. How the Software Feature Selection Setting 122 may be used in generating the final processor feature controls will now be discussed in connection with the Final Feature Control Unit 130 shown in FIG. 1.

As further shown in FIG. 1, the Final Feature Control Unit 130 may provide one or more Final Feature Control Signals 132 whose states may be based on the Feature Disable 114 signal, the User Feature Control Setting 112, and the Software Feature Selection Setting 122. The Final Feature Control Signals 132 may provide the ultimate enable or disable controls for the processor features controlled by Processor Feature Control Unit 10. In one embodiment, the Final Feature Control Unit 130 may disable all of the processor features it controls if the Feature Disable 114 signal is asserted or active (indicating that the User Feature Control Setting 112 has not been updated or set). In one embodiment, the Final Feature Control Unit 130 may enable or disable processor features in accordance with their corresponding settings in the User Feature Control Setting 112. In one embodiment, the Final Feature Control Unit 130 may enable or disable processor features in accordance with their corresponding settings in the Software Feature Selection Setting 122. In one embodiment, if the Feature Disable 114 signal is de-asserted or inactive, the Final Feature Control Unit 130 may enable processor features for which the corresponding settings in the User Feature Control Setting 112 and the Software Feature Selection Setting 122 both indicate the feature should be enabled, otherwise the corresponding feature may be disabled.

Still referring to FIG. 1, the Processor Feature Control Unit 10 may also provide for detection and handling of error conditions. An Illegal Feature Selection Detection Unit 140 may detect and indicate various illegal processor feature selection conditions by asserting one or more Illegal Feature Select Error Signals 142. In one embodiment, the Illegal Feature Selection Detection Unit 140 may indicate an error condition when the User Feature Control Unit 100 attempts to enable a processor feature before the User Feature Control Setting 112 and/or the Lock 108 signal has/have been updated or set. In one embodiment, the Illegal Feature Selection Detection Unit 140 may indicate an error condition when the Software Feature Selection Unit 120 attempts to enable a processor feature before the User Feature Control Setting 112 and/or the Lock 108 signal has/have been updated or set. In one embodiment, the Illegal Feature Selection Detection Unit 140 may indicate an error condition when the Software Feature Selection Unit 120 attempts to enable a processor feature that is not user enabled by the User Feature Control Setting 112 of the User Feature Control Unit 100. The Illegal Feature Select Error Signal 142 may communicate such error conditions to allow appropriate error handling steps to be taken by the processor or other system devices.

As further shown in FIG. 1, an Illegal UFCU Write Detection Unit 150 may assert the Illegal Write to UFCU Signal 152 when it detects an attempt to change the User Feature Control Setting 112 after it has already been updated or set. Such an illegal write may be detected when the Lock 108 signal and the User Feature Control Write Strobe 106 are both asserted. The Illegal Write to UFCU Signal 152 may communicate an illegal attempt to change the User Feature Control Setting 112 so that the processor or other system devices can respond appropriately. For example, such an illegal write condition could indicate that a virus or some other unauthorized system device is attempting to override the User Feature Control Setting 112 for malicious purposes.

The embodiment of FIG. 1 may provide control over a single processor feature, or it may provide control over multiple individual processor features of integer number "n". This is indicated by "n=number of feature control parameters" and the various signal paths or variables of width "n" shown in FIG. 1.

Figure 2:
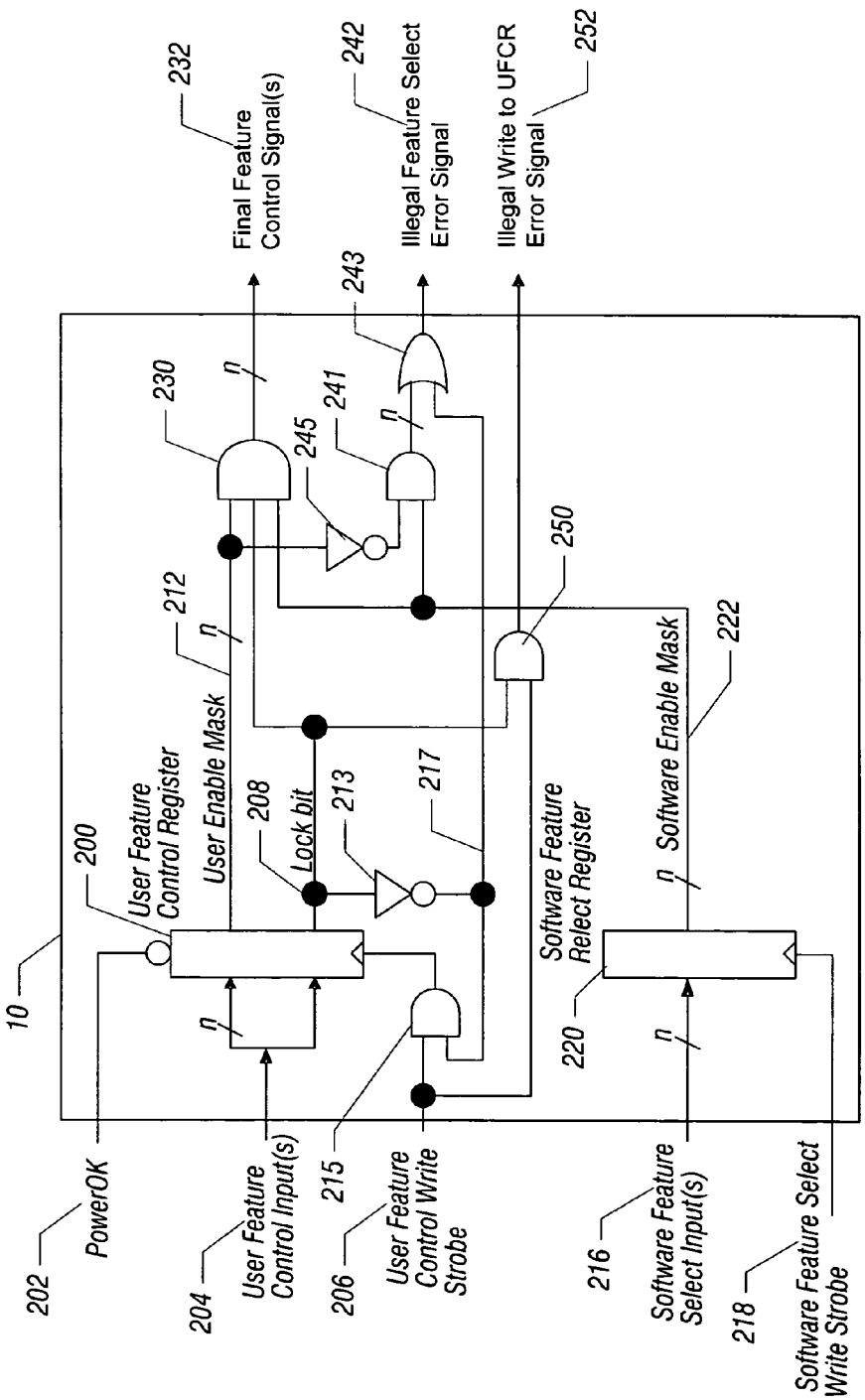
FIG. 2 is a schematic diagram of a detailed implementation of a processor feature control apparatus according to an embodiment of the present invention.

Referring now to FIG. 2, shown is a schematic diagram of a detailed implementation of a processor feature control apparatus according to an embodiment of the present invention. A User Feature Control Register 200 may store a User Enable Mask 212 and a Lock Bit 208. In this embodiment, the bits in the User Enable Mask 212 and Lock Bit 208 may all be initialized to logic zero values in response to a logic zero on the PowerOK 202 signal during a power up of the Processor Feature Control Unit 10. After power up, the User Feature Control Register 200 (including the User Enable Mask 212 and the Lock Bit 208) may be updated in the following manner. The processor provides user feature control selections on the User Feature Control Inputs 204 and a logic one value on the input to the Lock Bit 208 and writes these values to the User Feature Control Register 200 by asserting a User Feature Control Write Strobe 206. The logic one value for the Lock Bit 208 causes Inverter 213 to drive a logic zero value at input 217 of AND Gate 215 which prevents the User Feature Control Write Strobe 206 from causing any further changes to the state of the User Feature Control Register 200, including any change to the Lock Bit 208. In this manner the User Feature Control Register 200 and Lock Bit 208 are locked to prevent inappropriate tampering with the user feature control settings of the User Enable Mask 212.

As further shown in FIG. 2, a Software Feature Select Register 220 may provide a Software Enable Mask 222 that reflects software selections regarding enabling or disabling certain processor features. The Software Enable Mask 222 can be updated by the processor in response to software executing on a computer system. For example, in one embodiment operating system software and application software could execute processor instructions to update the Software Enable Mask 222 to enable or disable certain processor features. In response to such instructions the processor may update the Software Enable Mask 222 of the Software Feature Select Register 220 by providing the desired feature enable or disable values on Software Feature Select Inputs 216 and asserting a Software Feature Select Write Strobe 218.

Still referring to FIG. 2, Final Feature Control Signal(s) 232 may be generated by AND Gate 230 in the following manner. If the Lock Bit 208 is zero, then all of the Final Feature Control Signals 232 are zero to disable all processor features controlled by the Processor Feature Control Unit 10. If the Lock Bit 208 is one and the corresponding values of the User Enable Mask 212 and Software Enable Mask 222 are both one, then the corresponding Final Feature Control Signal 232 is driven to a logic one value to enable the corresponding processor feature. If either of the corresponding User Enable Mask 212 value or corresponding Software Enable Mask 222 value is zero, then the corresponding Final Feature Control Signal 232 is driven to a logic zero value to disable the corresponding processor feature.

In the embodiment of FIG. 2, Illegal Feature Select Error Signal 242 may be generated by the combination of OR Gate 243, AND Gate 241 and Inverters 245 and 213 in the following manner to indicate various illegal feature selection conditions. If software attempts to enable a feature that is not user enabled, an error signal is generated because the corresponding value of the User Enable Mask 212 is zero (user disabled) which causes Inverter 245 to drive a one on its input to AND Gate 241. Since the corresponding value of the Software Enable Mask 222 is one (software enabled), AND Gate 241 drives a one on its output, which causes OR Gate 243 to drive a one on the Illegal Feature Select Error Signal 242. Another illegal condition may be detected when software attempts to use a feature before the User Enable Mask 212 has been committed, updated or set. In one embodiment, a zero value for Lock Bit 208 (meaning the User Enable Mask 212 has not been committed, updated or set) may cause Inverter 213 to drive a one value at input 217 to OR Gate 243 which may cause OR Gate 243 to drive a one value on all Illegal Feature Select Error Signals 242. In this manner, software may receive an illegal feature select error indication if it attempts to enable any user controlled feature before the user feature control settings have been committed, updated or set. The Illegal Feature Select Error Signal(s) 242 may communicate such error conditions to allow appropriate error handling steps to be taken by the software, processor, or other system device.

Still referring to FIG. 2, an Illegal Write to UFCR Error Signal 252 may be generated by AND Gate 250 when the Lock Bit 208 is one and the User Feature Control Write Strobe 206 is asserted to one. This may occur when an attempt is made to change the Lock Bit 208 and/or the User Enable Mask 212 after the User Feature Control Register 200 (including the User Enable Mask 212 and the Lock Bit 208) has already been written and locked. The Illegal Write to UFCR Error Signal 252 may communicate an illegal attempt to change all or some portion of the User Feature Control Register 200 (including the User Enable Mask 212 and the Lock Bit 208) so that the processor or other devices in the system can respond appropriately. For example, such an illegal write condition could indicate a virus or some other unauthorized system device is attempting to override the user feature control setting and the lock bit for malicious purposes.

The embodiment of FIG. 2 may provide control over a single processor feature, or it may provide control over multiple individual processor features of integer number "n". This is indicated by "n=number of feature control parameters" and the various signal paths or variables of width "n" shown in FIG. 2.

Figure 3:
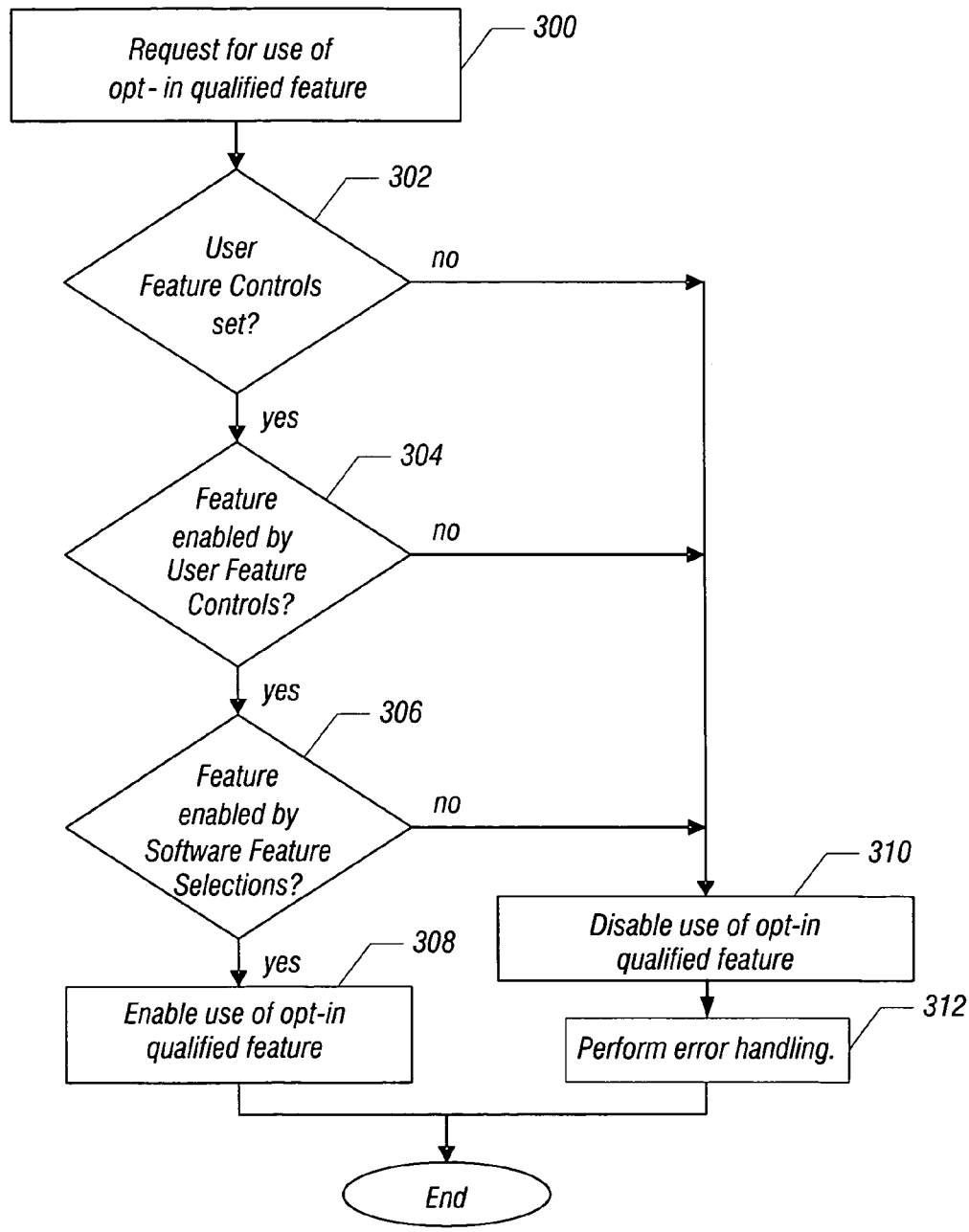
FIG. 3 is a flow diagram illustrating handling of opt-in qualified processor features according to an embodiment of the present invention.

Referring to FIG. 3, shown is a flow diagram illustrating handling of opt-in qualified processor features according to an embodiment of the present invention. A processor receives a request for use of an opt-in qualified processor feature, which is a feature that requires user selectable feature control preferences to be committed, updated or set before any opt-in qualified feature can be enabled (block 300). The feature request could originate from software, a hardware device or some other device that wants to use or access the requested processor feature. The processor determines whether the user feature control preferences have been committed, updated or set (diamond 302). This may be done by checking the status of a lock signal or lock bit, or by other mechanisms. If the user feature control preferences have not been committed, updated or set (diamond 302), use of the requested feature may be disabled (block 310) and an error condition may be signaled (block 312) to allow the processor to respond appropriately to the requester. If the user feature control preferences have been committed, updated or set (diamond 302), the processor may determine whether the requested feature is enabled by the user feature control setting corresponding to the requested feature (diamond 304). If not, the feature disabling and error condition signaling and handling of blocks 310 and 312 are performed. If the requested feature is user enabled (diamond 304), the processor may determine whether the requested feature is enabled by the software feature selection setting corresponding to the requested feature (diamond 306). If not, the feature disabling and error condition signaling and handling of blocks 310 and 312 are performed. If the requested feature is software enabled (diamond 306), the processor may enable use of the opt-in qualified processor feature (block 308) and the processor may execute or allow use of the requested feature.

Figure 4:
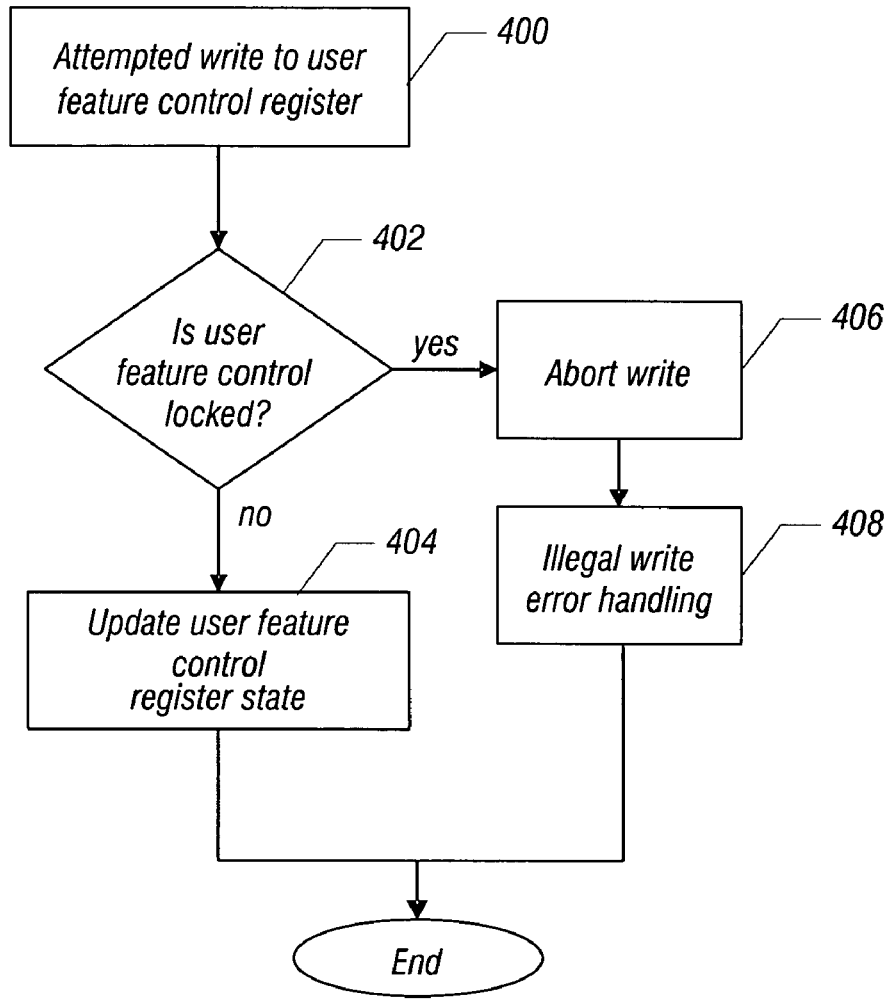
FIG. 4 is a flow diagram illustrating handling of updates to user feature control data according to an embodiment of the present invention.

Referring to FIG. 4, shown is a flow diagram illustrating handling of updates to user feature control data according to an embodiment of the present invention. When an attempt is made to write, change or otherwise update a user feature control register or date (block 400), the processor determines whether the user feature control register or data is locked (diamond 402). In one embodiment, the lock condition may be indicated by a lock signal or lock bit. In one embodiment, the lock condition may be indicated by the value of a software variable. If the user feature control register or data is locked (diamond 402), the attempt to write, change or otherwise update the user feature control register or data may be aborted or prevented (block 406) and an illegal write condition may be indicated for appropriate handling by the processor or other system device (block 408). If the user feature control register or data is not locked (diamond 402) (indicating in one embodiment that the user feature control preferences have not yet been set), the user feature control register or setting may be updated or set accordingly (block 404).

Embodiments may be implemented in logic circuits, state machines, microcode, or some combination thereof. Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), dynamic random access memories (DRAMs), erasable programmable read-only memories (EPROMs), flash memories, electrically erasable programmable read-only memories (EEPROMs), magnetic or optical cards, network storage devices, or any type of media suitable for storing electronic instructions.

Figure 5:
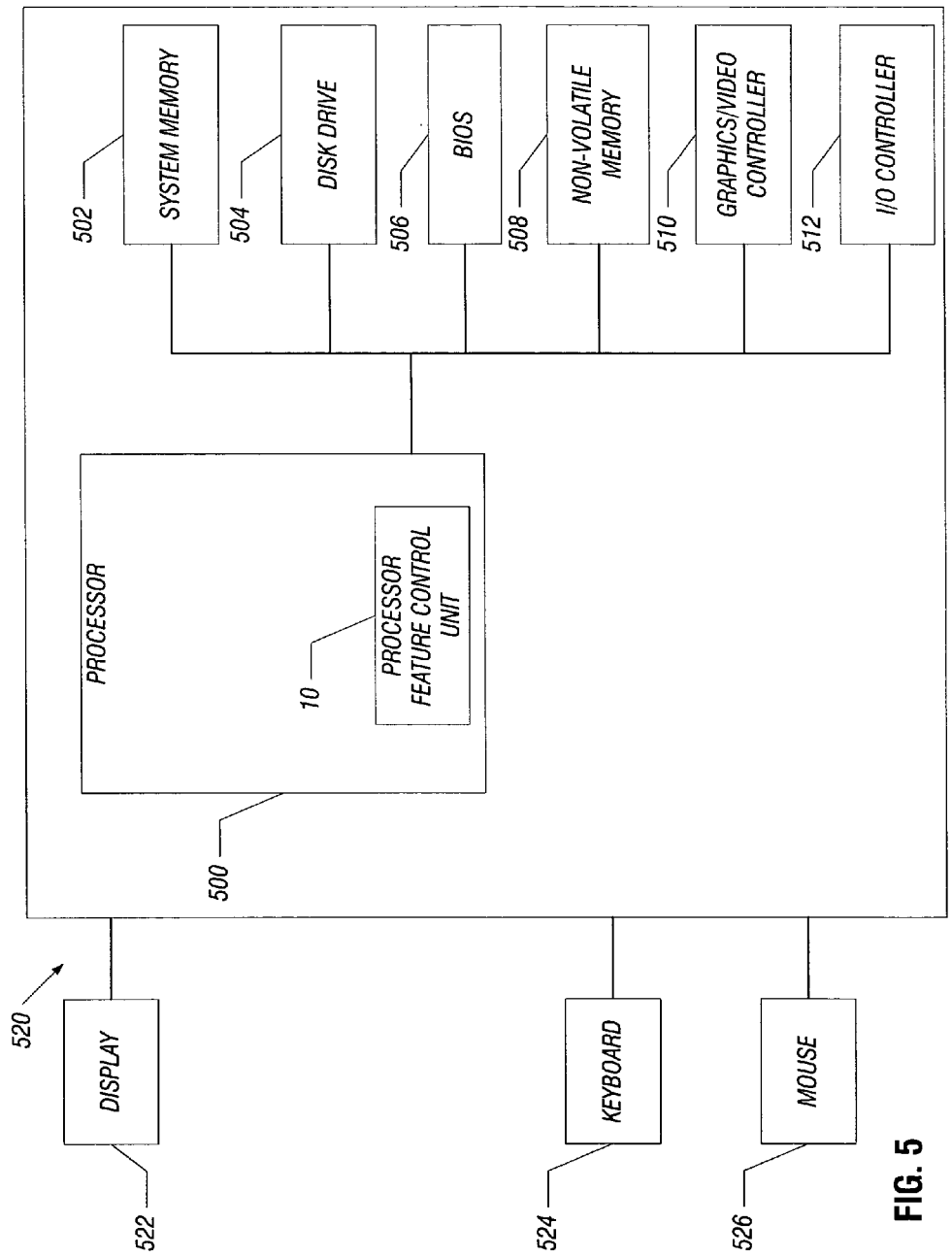
FIG. 5 illustrates a block diagram of a computer system according to an embodiment of the present invention.

Example embodiments may be implemented in software for execution by a suitable computer system configured with a suitable combination of hardware devices. FIG. 5 is a block diagram of computer system 520 with which embodiments of the invention may be used.

Referring to FIG. 5, shown is a block diagram of a computer system according to an embodiment of the present invention. To address the potential user concerns regarding some processor features, Computer System 520 includes a Processor 500 having a Processor Feature Control Unit 10 to provide a user opt-in processor feature control capability for certain processor features. The Processor 500 executes instructions stored in System Memory 502, some of which may require the use of user opt-in qualified features or instructions of the Processor 500. The Processor Feature Control Unit 10 may only enable the use of such qualified processor features if certain conditions are met. In one embodiment, the Processor Feature Control Unit 10 may disable all of the processor features it controls if user feature control preference settings have not been committed, updated or set. In one embodiment, the Processor Feature Control Unit 10 may enable or disable processor features in accordance with their corresponding user feature control preference settings after they have been committed, updated or set. In one embodiment, the Processor Feature Control Unit 10 may enable or disable processor features in accordance with their corresponding settings made by a software feature selection. In one embodiment, the Processor Feature Control Unit 10 may enable processor features for which the corresponding user feature control preference setting and software feature selection setting both indicate the feature should be enabled, otherwise the corresponding feature may be disabled.

As further shown in FIG. 5, the Computer System 520 may include a Keyboard 524 and a Mouse 526 to allow a user to provide user feature control selections. There are many ways known to those skilled in the art for allowing a user to make such preference selections. In one embodiment, the user may make user feature control selections through the computer's Basic Input Output System (BIOS) 506 and the user selections may be stored in a Non-Volatile Memory 508 for subsequent use by the Processor Feature Control Unit 10. In one embodiment, Non-Volatile Memory 508 may be any memory that can retain stored data in the absence of system electrical power. For example, erasable programmable read-only memories (EPROMs), flash memories, electrically erasable programmable read-only memories (EEPROMs), magnetic, and optical memories do not require electrical power to maintain stored data. In addition, dynamic or static random access memories (DRAMS or SRAMs) could use a battery to maintain stored data when system power is removed. In one embodiment, the user feature control preference selections stored in the Non-Volatile Memory 508 may be used to update the state of a user feature control setting in the Processor Feature Control Unit 10 during boot-up of the Computer System 520. In one embodiment, in connection with such update the Processor Feature Control Unit 10 may lock the user feature control setting to prevent any inappropriate changes after boot-up by operating system software or application software.

Thus, a method, apparatus, and system for a user opt-in processor feature control capability has been described. While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A hardware apparatus comprising:
a feature control unit of a processor to provide a user control setting during boot up of the hardware apparatus to control, in part, enabling or disabling of at least one processor hardware feature, wherein the at least one processor hardware feature is not enabled until the user control setting is effectuated, wherein the at least one processor hardware feature includes hardware within the processor to perform a function within the processor;
a feature lock unit of the processor to prevent a change to the user control setting responsive to a lock signal, wherein the lock signal is de-asserted responsive to a reset signal during the boot up to enable the user control setting to be updated, and is asserted after a write strobe that allows the update to the user control setting and to thereafter prevent the change to the user control setting;
a software feature selection unit of the processor to provide a software feature selection setting updated according to a software feature selection input received from software to control, in part, enabling or disabling of the at least one processor hardware feature, wherein the user control setting and the software feature selection setting are distinct; and
a logic coupled to the software feature selection unit and the feature control unit and to generate a control signal to disable a first processor hardware feature if at least one of the user control setting and the software feature selection setting are indicative of the disabling, wherein the logic is to enable the first processor hardware feature only if the user control setting and the software feature selection setting are indicative of the enabling.

2. The apparatus of claim 1, wherein any processor hardware feature not selected via the user control setting is automatically disabled.

3. The apparatus of claim 2, wherein said feature lock unit is to prevent a change to activate a disabled processor hardware feature.

4. The apparatus of claim 1, further comprising an illegal feature selection detection unit of the processor to detect and indicate a first illegal feature selection condition if the software feature selection unit attempts to enable a first processor hardware feature before the user control setting has been effectuated, the indication of the first illegal feature selection condition corresponding to an error condition to be sent to the processor to enable error handling.

5. The apparatus of claim 4, wherein said illegal feature selection unit of the processor is to detect and indicate a second illegal feature selection condition if the software feature selection unit attempts to enable a second processor hardware feature that was not selected by the user control setting.

6. The apparatus of claim 1, including an illegal write detection unit of the processor to detect and indicate an illegal write condition if an attempt is made to change the user control setting.

7. A method comprising:
receiving a request for use of an opt-in qualified processor hardware feature that requires a setting of a user feature control provided during boot up and a software feature selection setting distinct from the user feature control setting before the opt-in qualified processor hardware feature can be enabled, wherein the opt-in qualified processor hardware feature comprises hardware within a processor to perform a function;
determining whether the user feature control setting for the opt-in qualified processor hardware feature has been set via a user enable mask of a control register of a processor control unit, wherein a change to the user feature control setting is prevented responsive to a lock signal that is de-asserted responsive to a reset signal during the boot up to enable the user feature control setting to be updated and is asserted after a write strobe that allows the update to the user feature control setting and to thereafter prevent the change to the user feature control setting;
determining whether the software feature selection setting for the opt-in qualified processor hardware feature has been set via a software enable mask of a select register of the processor control unit; and
disabling the opt-in qualified processor hardware feature if either of the user feature control setting and the software feature selection setting has not been set, and enabling the opt-in qualified processor hardware feature if both the user feature control setting and the software feature selection setting have been set.

8. The method of claim 7, further comprising preventing software from accessing the opt-in qualified processor hardware feature via a status check of the processor control unit and signaling of an error condition.

9. The method of claim 7, further comprising preventing an update to the user feature control setting if the control register is locked.

10. The method of claim 7, further comprising detecting and indicating a first illegal feature selection condition if the software feature selection setting attempts to enable a first processor hardware feature before the user feature control setting has been received.

11. The method of claim 10, including detecting and indicating a second illegal feature selection condition if the software feature selection setting attempts to enable a second processor hardware feature that was not selected by the user feature control setting.

12. A hardware system comprising:
a dynamic random access memory coupled to store instructions for execution by a processor; and
the processor including:
a feature control unit to provide a user control setting during boot up of the system to control, in part, enabling or disabling of at least one processor hardware feature, wherein the at least one processor hardware feature is not enabled until the user control setting is effectuated, wherein the at least one processor hardware feature includes hardware to perform a function within the processor;
a feature lock unit to prevent a change to the user control setting responsive to a lock signal that allows the user control setting to be updated and to thereafter prevent the change to the user control setting, wherein the lock signal is de-asserted responsive to a reset signal during the boot up to enable the user control setting to be updated, and is asserted after a write strobe that allows the update to the user control setting and to thereafter prevent the change to the user control setting;
a software feature selection unit to provide a software feature selection setting provided by software executing on the processor to control, in part, enabling or disabling of the at least one processor hardware feature, wherein the user control setting and the software feature selection setting are distinct; and
a logic coupled to the software feature selection unit and the feature control unit and to generate a control signal to disable a first processor hardware feature if at least one of the user control setting and the software feature selection setting are indicative of the disabling, wherein the logic is to enable the first processor hardware feature only if the user control setting and the software feature selection setting are indicative of the enabling.

13. The system of claim 12, wherein any processor hardware feature not selected by the user control setting is automatically disabled.

14. The system of claim 13, wherein the feature lock unit is to prevent a change to activate an unselected processor hardware feature.

15. An article comprising a machine accessible medium containing instructions that, if executed, enable a system to:
receive a request for use of an opt-in qualified processor hardware feature that requires a setting of a user feature control provided during boot up and a software feature selection setting distinct from the user feature control setting before the opt-in qualified processor hardware feature can be enabled, wherein the opt-in qualified processor hardware feature comprises hardware within a processor to perform a function;
determine via a user enable mask of a control register of a processor control unit, whether the user feature control setting for the opt-in qualified processor hardware feature has been set, wherein a change to the user feature control setting is prevented responsive to a lock signal that is de-asserted responsive to a reset signal during the boot up to enable the user feature control setting to be updated and is asserted after a write strobe that allows the update to the user feature control setting and to thereafter prevent the change to the user feature control setting;
determine whether the software feature selection setting for the opt-in qualified processor hardware feature has been set via a software enable mask of a select register of the processor control unit; and
disable the opt-in qualified processor hardware feature if either of the user feature control setting and the software feature selection setting has not been set, and enable the opt-in qualified processor hardware feature if both the user feature control setting and the software feature selection setting have been set.

16. The article of claim 15, wherein the instructions enable the system to prevent software from accessing the opt-in qualified processor hardware feature via a status check of the processor control unit and signaling of an error condition.

17. The article of claim 15, wherein the instructions enable the system to detect and indicate a first illegal feature selection condition if the software feature selection setting attempts to enable a first processor hardware feature before the user feature control has been received.

18. The article of claim 17, wherein the instructions enable the system to detect and indicate a second illegal feature selection condition if the software feature selection setting attempts to enable a second processor hardware feature that was not selected by the user feature control setting.

19. The apparatus of claim 1, wherein the software feature selection setting is to be provided when none of the software executing on the hardware apparatus is making use of the at least one processor hardware feature.

* * * * *